United States Patent
Villacorta Hernandez et al.

(10) Patent No.: US 11,512,180 B2
(45) Date of Patent: Nov. 29, 2022

(54) METHOD FOR FABRICATING CARBON NANOPARTICLE POLYMER MATRIX COMPOSITES USING ELECTROMAGNETIC IRRADIATION

(71) Applicant: EDEN INNOVATIONS LTD., Perth (AU)

(72) Inventors: Byron Stanley Villacorta Hernandez, Redbank Plains (AU); Zhonghua Zhu, Indooroopilly (AU); Rowan Wayne Truss, Westlake (AU); Allan Godsk Larsen, Gentofte (DK); Gregory Howard Solomon, Cottlesloe (AU)

(73) Assignee: EDEN INNOVATIONS LTD., Perth (AU)

( * ) Notice: Subject to any disclaimer, the term of this patent is extended or adjusted under 35 U.S.C. 154(b) by 422 days.

(21) Appl. No.: 16/190,391

(22) Filed: Nov. 14, 2018

(65) Prior Publication Data
US 2020/0148853 A1    May 14, 2020

(51) Int. Cl.
*C08K 3/04*      (2006.01)
*C08K 7/06*      (2006.01)
(Continued)

(52) U.S. Cl.
CPC .............. *C08K 3/041* (2017.05); *C08J 3/203* (2013.01); *C08K 3/04* (2013.01); *C08K 7/06* (2013.01);
(Continued)

(58) Field of Classification Search
CPC ....................................................... C08K 3/041
See application file for complete search history.

(56) References Cited

U.S. PATENT DOCUMENTS 3,524,599 A * 8/1970 Heilenz ..................... B01F 7/26
                                         241/199.7
4,786,555 A * 11/1988 Howard, Jr. ............ A61L 27/10
                                         428/403

(Continued)

FOREIGN PATENT DOCUMENTS

JP          2012 062428 A      3/2012
WO    WO 2006/037949 A1    4/2006
(Continued)

OTHER PUBLICATIONS

Selcuk Poyraz, Lin Zhang, Albrecht Schroder, and Xinyu Zhang, "Ultrafast Microwave Welding/Reinforcing Approach at the Interface of Thermoplastic Materials", Applied Materials & Interfaces, 2015 American Chemical Society, Sep. 15, 2015, pp. 22469-22477, ACS Publications.

(Continued)

*Primary Examiner* — William D Young
(74) *Attorney, Agent, or Firm* — Stephen A. Gratton (57) ABSTRACT

A method for fabricating carbon nanoparticle polymer matrix composites includes the steps of: providing a nanoparticle mixture that includes carbon nanoparticles (CNPs), mixing the nanoparticle mixture and a plastic substrate into a homogenous (CNP)/polymer mixture having an interconnected network of carbon nanoparticles (CNPs); and irradiating the (CNP)/polymer mixture with electromagnetic radiation controlled to form a polymer composite and uniformly consolidate and/or interfacially bond the carbon nanoparticles (CNPs) into the polymer matrix.

7 Claims, 6 Drawing Sheets

(51) Int. Cl.
    H01B 1/24      (2006.01)
    C08J 3/20      (2006.01)
(52) U.S. Cl.
    CPC .......... *H01B 1/24* (2013.01); *C08K 2201/001*
                   (2013.01); *C08K 2201/011* (2013.01)

(56)                 References Cited

U.S. PATENT DOCUMENTS

| | | | |
|---|---|---|---|
| 8,092,778 | B2 | 1/2012 | Zhu et al. |
| 8,911,859 | B1 | 12/2014 | Spatcher |
| 9,382,392 | B2 | 7/2016 | Al-Harthi et al. |
| 10,472,240 | B2 | 11/2019 | Zhu et al. |
| 2003/0224132 | A1 | 12/2003 | Han |
| 2008/0090951 | A1 | 4/2008 | Mao et al. |
| 2009/0004460 | A1* | 1/2009 | Gruber .................. C08K 3/346 428/323 |
| 2011/0086956 | A1 | 4/2011 | Boscia |
| 2011/0260116 | A1 | 10/2011 | Plee |
| 2011/0272641 | A1 | 11/2011 | Bastiaens et al. |
| 2012/0189530 | A1 | 7/2012 | Marmaro et al. |
| 2015/0322622 | A1 | 11/2015 | Gaillard et al. |
| 2016/0325491 | A1* | 11/2016 | Sweeney ............. B29C 35/0805 |

FOREIGN PATENT DOCUMENTS

| | | |
|---|---|---|
| WO | WO 2007/119231 A1 | 10/2007 |
| WO | WO 2015/094915 A1 | 6/2015 |
| WO | WO 2015/130401 A2 | 9/2015 |

OTHER PUBLICATIONS

Nam Dong Kim et al, "Microwave Heating of Functionalized Graphene Nanoribbons in Thermoset Polymers for Wellbore Reinforcement", Applied Materials & Interfaces, 2016 American Chemical Society, May 3, 2016, pp. 12985-12991, ACS Publications.

Charles B. Sweeney et al., "Radio Frequency Heating of Carbon Nanotube Composite Materials", Applied Materials & Interfaces 2018, 10, 2018 American Chemical Society, 2752-27259, Jul. 24, 2018, ACS Publications.

Tongfei Wu, Yongzheng Pan, Erjia Liu, Lin Li, "Carbon Nanotube/Polypropylene Composite Particles for Microwave Welding", Journal of Applied Polymer Science, vol. 126, pp. E283-E289 (2012), Wiley Periodicals, Inc.

Ester Vazquez and Maurizio Prato, "Carbon Nanotube and Microwaves Interactions, Responses, and Applications", 2009 American Chemical Society, vol. 3, No. 12, pp. 3819-3824, published online Dec. 22, 2009.

T. J. Imholt et al., "Nanotubes in Microwave Fields: Light Emission, Intense Heat, Outgassing, and Reconstructions", Chem. Mater. 2003, 15, pp. 3969-3970, 2003 American Chemical Society, published on Web Sep. 27, 2003.

Charles B. Sweeney et al., "Welding of 3D-printed carbon nanotube-polymer composites by locally induced microwave heating", Science Advances 2017, pp. 1-6, Jun. 14, 2017.

Elise Ryan, "Feasibility Assessment and Optomisation of the Fabrication of Carbon Nanotube/Pololefin Composites using Microwave Irradiation", Bachelor of Engineering and Master of Engineering (BE/ME) Thesis, The University of Queensland, pp. 1-154, Dec. 15, 2015, Australia.

Jongju Yun et al., "Extraordinary High Microwave Absorption Cross Section of Ultralong Carbon Nanotubes", J. Phys. Chem. C 2014, 118, 13757-13763, 2014 American Chemical Society, ACS Publications. Jun. 12, 201.

Chihyung Wang et al. "Strong Carbon-Nanotube-Polymer Bonding by Microwave Irradiation" Advanced Functional Materials 2007, 17, pp. 1979-1983, Wiley InterScience, 2007.

Mei Zhang et al., "Strong, Transparent, Multifunctional, Carbon Nanotube Sheets", "Strong, Transparent, Multifunctional, Carbon Nanotube Sheets", Science, vol. 39, Aug. 19, 2005, pp. 1215-1219.

International Application No. PCT/US19/61383, International Search Report and Written Opinion of the International Searching Authority, dated Feb. 21, 2020, pp. 1-10.

Bikiaris, "Microstructure and Properties of Polypropylene/Carbon Nanotube Nanocomposites." Materials, vol. 3, No. 4, 2010, Abstract, doi:10:3390/ma3042884.

PCT/IB2018/000893 International Search Report, dated Nov. 1, 2018, pp. 1-6.

PCT/IB2018/000893 Written Opinion, dated Nov. 1, 2018, pp. 1-5.

Mallakpour S. et al. "Anionic clay intercalated by multi-walled carbon nanotubes as an efficient 3D nanofiller for the preparation of high-performance L-alanine amino acid containing poly (amide-imide) nanocomposites", Journal of Material Science, 2014, vol. 49, pp. 7004-7013.

Chang, J. et al. "Carboxymethyl cellulose assisted preparation of water-processable halloysite nanotubular composites with carboxyl-functionalized multi-carbon nanotubes for simultaneous voltammetric detection of uric acid, guanine and adenine in biological samples". Journal of Electroanalytical Chemistry, Sep. 2016, vol. 780, pp. 103-113.

Senthivel et al., "Studies on the Mechanical Properties of Carbon Black/Halloysite Nanotube Hybrid fillers in Nitrile rubber Nanocomposite", Science Direct, Published 2015, pp. 3627-3637.

IUPAC. Compendium of Chemical Terminology, 2nd ed. (the "Gold Book"). Compiled by A. D. McNaught and A. Wilkinson. Blackwell Scientific Publications, Oxford (1997). Online version (2019-) created by S. J. Chalk. ISBN 0-9678550-9-8. https://doi.org/10.1351/goldbook.

European Patent Application No. 19884770.9-1102, Extended European Search Report, pp. 1-9, dated Jul. 22, 2022.

M. J. Martinez-Morlanes et al., "Effects of gamma-irradiation on UHMWPE/MWNT nanocomposites", Composites Science and Technology 71, No. 3, Nov. 20, 2010, Elsevier, Amsterdam, NL, pp. 282-288.

Han Seunghin et al., "Strengthening and stiffening carbon fiber epoxy composites by halloysite nanotubes, carbon nanotubes and silicon carbide whiskers", Applied Clay Science, Elsevier, Amsterdam, NL, vol. 83, Sep. 5, 2018, pp. 375-382.

India Patent Application No. 202117019654, Examination Report Under Sections 12 & 13 of the Patents Act, dated Mar. 30, 2022, pp. 1-5.

* cited by examiner

METHOD FOR FABRICATING CARBON NANOPARTICLE POLYMER MATRIX COMPOSITES USING ELECTROMAGNETIC IRRADIATION

FIELD

This disclosure relates to a method for fabricating carbon nanoparticle polymer matrix composites using electromagnetic irradiation, and to polymer composites fabricated using the method.

BACKGROUND

Carbon nanoparticles (CNPs) are being used to fabricate a variety of materials such as polymer matrix composites. The performance of these polymer composites is dependent on the interfacial bonding between the carbon nanoparticles (CNPs) and the polymeric matrix. One method for fabricating composites involves melting of the polymeric matrixes using conventional heating methods such as a furnace or by heat generation through an extruder. Typically coupling agents are added to enhance interfacial bonding between the carbon nanoparticles and the polymeric matrix.

Microwave (MW)/radio frequency (RF) heating has a number of advantages over conventional heating due to the ability to rapidly heat up materials via the interactions with the electromagnetic radiation. Nonetheless, the great majority of polymeric substrates are almost transparent to microwaves as they display only very low dielectric losses in the radio/microwave frequency range, which makes it difficult to heat them efficiently by this method.

In contrast, in the case of carbon nanotubes (CNTs), a specific kind of carbon nanoparticle (CNP), several studies have shown that when carbon nanotubes (CNTs) are exposed to microwaves, due to their high dielectric loss (bound charge) and their conductivity (free electrons), strong energy absorption is observed, producing intense heating, outgassing and light emission. In one study, a single-walled carbon nanotube (CNT) exposed to microwave irradiation produced localized temperatures reaching 2000° C.

Studies have also been performed on topics related to CNT/polymer bonding by microwave irradiation. These studies demonstrated the feasibility of microwaving a thin layer of multi-walled carbon nanotubes (CNTs) to weld together plastic parts. These studies also optimized simple methods for welding thermoplastics using carbon nanotubes (CNTs) and microwave irradiation and evaluated the strength and quality of the welding. In addition, researchers have shown that microwave radiation can provide many desirable features in other areas of polymer and composite processing. These include effects such as enhanced polymerization rates and glass transition temperatures of thermosets, inducing crosslinking via free-radicals induction, and increased adhesion between conventional carbon fibers and thermoset matrixes.

This disclosure is directed to a method for fabricating polymer matrix composites which utilizes the heat generated by electromagnetic irradiation of carbon nanoparticles (CNPs) mixed with a polymer substrate. In addition, the method controls the released heat to uniformly consolidate a polymer powder/carbon nanoparticles (CNPs) mixture into a nanocomposite with improved electrical and/or mechanical properties.

However, the foregoing examples of the related art and limitations related therewith are intended to be illustrative and not exclusive. Other limitations of the related art will become apparent to those of skill in the art upon a reading of the specification and a study of the drawings.

SUMMARY

A method for fabricating carbon nanoparticle polymer matrix composites includes the steps of: providing a nanoparticle mixture comprising carbon nanoparticles (CNPs) having characteristics selected to facilitate electromagnetic irradiation; providing a plastic substrate having a selected composition and properties configured to provide a polymer matrix; mixing the carbon nanoparticle mixture and the plastic substrate into a homogenous CNP/polymer mixture having an interconnected network of carbon nanoparticles (CNPs); and irradiating the (CNP)/polymer mixture with electromagnetic radiation controlled to uniformly consolidate and/or interfacially bond the carbon nanoparticles (CNPs) into the polymer matrix. The method can also include the step of compacting the (CNP)/polymer mixture or eliminating any undesirable material phase that may limit heat transfer prior to the irradiating step.

In illustrative embodiments of the method, the electromagnetic radiation comprises radio and/or microwave radiation at a selected wavelength and power. In addition, the carbon nanoparticles can include carbon nanotubes (CNTs), carbon nanofibers (CNFs), graphite nanoparticles, carbon black, amorphous carbon and mixtures of different carbon nanoparticles having a selected percentage range in the nanoparticle mixture. The nanoparticle mixture can also include other non-carbon particles. Examples of non-carbon materials include nano- and micro-materials such as silica, clay, metals, organic fibers and inorganic fibers.

In various embodiments of the method, different types of nanoparticles produced from different processes can be blended or mixed together to provide a particular nanoparticle mixture. In one embodiment, mixtures of carbon nanoparticles (CNPs), susceptible to radio and/or microwave irradiation, and other non-carbon nano- and micro-materials (NMMs), having weak or no susceptibility to radio and/or microwave irradiation, can be used to fabricate different nanoparticle polymer matrix composites. By using different nanoparticles in the nanoparticle mixture, a broader range of chemical and physical functionalities can be included in the resulting polymer matrix. Exemplary characteristics for the carbon nanoparticles (CNPs) and nano- and micro-materials (NMMs) include particle size, particle distribution, particle agglomeration, particle aspect ratio, electrical conductivity, thermal conductivity, bulk density and crystallinity level.

A carbon nanoparticle polymer matrix composite includes a polymer matrix comprising a plastic substrate; and a plurality of interconnected electromagnetically irradiated carbon nanoparticles (CNPs) interfacially bonded to the polymer matrix and interconnected to form a microstructure that encompasses the polymer matrix.

BRIEF DESCRIPTION OF THE DRAWINGS

Exemplary embodiments are illustrated in the referenced figures of the drawings. It is intended that the embodiments and the figures disclosed herein be considered illustrative rather than limiting.

DETAILED DESCRIPTION

As used herein, the term "carbon nanoparticles (CNPs)" means particles comprising an allotrope of carbon or mixtures of two or more allotropes of carbon with one or more particle dimensions on the order of 500 nanometers (nm) or less. Examples of such allotropes are carbon nanotubes (CNTs), carbon nanofibers (CNFs), and graphene. The term "nanotubes" mean cylindrical nanostructures comprising one or more cylindrical tubes of atoms having a high length to diameter ratio. Nanotubes can be categorized as single-walled nanotubes (SWNTs) or multi-walled nanotubes (MWNTs). "Nanotube particles" comprise individual molecules, particles, or agglomerates of particles comprised of nanotubes. The term "nanofibers" means cylindrical nanostructures with a high length to diameter ratio, with atomic layers in a stacked plate, cup, or cone configuration. "Nanofiber particles" comprise individual molecules, particles, or agglomerates of particles comprised of nanofibers. "Graphene" means small particles of a two-dimensional hexagonal lattice of carbon atoms. Graphene is the basic structure of many other allotropes of carbon, including carbon nanotubes, carbon nanofibers, graphite, and other fullerenes.

A method for fabricating carbon nanoparticle polymer matrix composites includes the initial step of providing a nanoparticle mixture comprising carbon nanoparticles (CNPs) in a significant percentage and having characteristics selected to facilitate electromagnetic irradiation. The selected characteristics for the carbon nanoparticles (CNPs) can include choice of particle type as well as other intrinsic properties. Suitable mixtures of carbon nanoparticles (CNPs) can include carbon nanotubes (CNTs), carbon nanofibers (CNFs), graphene, carbon black, amorphous carbon and mixtures of these materials. In some of the claims to follow the nanoparticle mixture is termed "a first substrate".

The method also includes the step of providing a plastic substrate having a selected composition, and properties. Suitable substrates may include polyethylene (PE), polypropylene (PP), nylon, polystyrene, and polycarbonate, but any thermoplastic and thermoset polymer and combinations thereof can be utilized. In some of the claims to follow the nanoparticle mixture is termed "a second substrate".

Following providing of the nanoparticle mixture, and the plastic substrate, the method includes the step of mixing the nanoparticle mixture and the plastic substrate to provide a homogenous (CNP)/polymer mixture. The mixing step can be performed using either a dry or a wet method alone or assisted by any other dispersing technique depending on the type of polymer substrate (i.e., solid, liquid or suspension). In addition, the carbon nanoparticles (CNPs) can be chemically or physically modified, pre-treated or combined with other modifiers before mixing with the plastic substrate. During the mixing step, the (CNP)/polymer mixture can also be treated or dried and consolidated by any appropriate method, such as, but not limited to, oven drying, vacuum drying, desiccation, pressure, and like methodologies.

Following the mixing step, the exterior and interior surfaces of the (CNP)/polymer mixture are covered by the carbon nanoparticles (CNPs), such that the distributed carbon nanoparticles (CNPs), though dispersed, remain interconnected. This forms an electrical network that extends throughout the whole (CNP)/polymer mixture, yielding a kind of "composite" dielectric lossiness to the un-heated material. In addition, the whole (CNP)/polymer mixture is more susceptible to heating by the radiation as the electrical length of unheated material scales with that of the waves. By proper selection of the characteristics of the carbon nanoparticles (CNPs), the polymer substrate, and potentially also the nano- and micro-material (NMMs), such as concentration ratios, carbon nanoparticle (CNP) primary agglomeration, and carbon nanoparticle (CNP) and nano- and micro-material (NMMs) intrinsic properties, an adequate and fast response can be obtained during the subsequent irradiation step (from seconds to ~4 min) and the desired nanocomposite's final properties can be achieved.

Following the mixing step, the (CNP)/polymer mixture can be exposed to electromagnetic radiation, such as radio and/or microwave waves, controlled to form the polymer composite and uniformly consolidate and/or interfacially bond the carbon nanoparticles (CNPs), and other nano- and micro-materials (NMMs) into the polymer matrix. The irradiation step can be performed using appropriate processing conditions such as heating ramps, pulses, dwelling periods, environmental chamber controls, annealing/cooling/quenching steps, tuned microwave power and proper irradiation time, to allow the most effective heat transfer scenario from the carbon nanoparticles (CNPs) into the polymer matrix to fully and effectively consolidate the nanoparticle polymer composite.

The carbon nanoparticle polymer matrix composite can subsequently be processed by any type of conventional polymer processing steps when using thermoplastic substrates. Moreover, the carbon nanoparticle polymer matrix composite can also be post-processed again a number of times by post-irradiation re-melting, which is useful when conventional heat cannot be directly applied to the composites, such as in adhesive applications joining structural composites and hybrid materials.

This fabrication method produces carbon nanoparticle polymer matrix composites that are competitive with those made by conventional polymer processing methods. This is due to the high energy efficiency, selectivity and speed of the electromagnetic irradiation method, the ability to make carbon nanoparticle polymer composites without coupling agents and the superior properties that can be achieved using this method. Potential applications of the thus produced carbon nanoparticle polymer matrix composites can find valuable use in prototyping, rotational molding polymer grades, electromagnetically induced adhesives, automotive composite plastic parts, materials/parts welding, compression-molded goods, aerospace high-performance nanocomposites, conductive nanocomposites for antistatic and electromagnetic shielding applications, and masterbatching (CNP concentrations >7.5%).

The present fabrication method using microwave irradiation not only utilizes molecularly generated heat to consolidate solid composites by melting polymeric matrixes, but also, yields stronger molecular interactions between the carbon nanoparticles (CNPs) and the polymer matrix enhancing their interfacial bonding. This induced interfacial bonding is important to avoid the use of coupling agents commonly added to overcome such interfacial incompatibilities that often lead to poor mechanical load transfer in composites. Such interfacial issues are present in the majority of composites, but particularly predominant in composites based on non-polar matrixes such as polyolefins. Hence, such an alternative composite processing is not only fast, low-cost, energy efficient, additive-less, and environmentally friendly, but leads to nanocomposites with superior mechanical and electrical properties than those of their counterparts processed by conventional thermal heating. These unexpected results are indicative of the unobviousness of the present method.

Specifically, uniform composites can be fabricated by irradiating homogenous (CNP)/polymer mixtures with microwaves/radio waves. The (CNP)/polymer mixtures, depending on the intrinsic properties of the carbon nanoparticles (CNPs), such as primary agglomeration state, polymer particle size and distribution, viscosity, compaction level, and extent of the mixing state, form dielectrically lossy networks capable of effectively interacting with the waves. As a result of these electromagnetic interactions, monolithic nanocomposite blocks are fully melted/consolidated, and the CNP-polymer interfacial bonding, as well as the carbon nanoparticles (CNPs) interconnection, are enhanced.

In addition, the interconnected carbon nanoparticles (CNPs) form a network that encompasses the whole of the carbon nanoparticle (CNP) polymer matrix composite as a scaffold-like microstructure. As will be further explained, this microstructure produces favorable electromagnetic phenomena, and forms an assembled "skeletal structure" providing additional and unique mechanical and electrical characteristics for the carbon nanoparticle polymer matrix composite. Furthermore, the microwave induction and intense heat released by the carbon nanoparticles (CNPs) produce a partial crosslinking/oxidation of the polymer chains surrounding the carbon nanoparticles (CNPs) and a higher crystallinity. These characteristics give the composites a higher stiffness and interfacial bonding. In addition, nanocomposites formed by this method exhibit more than one order of magnitude superior electrical conductivity, more than 20% greater moduli values, and strength values 10% higher than nanocomposites prepared via conventional thermal processing at equivalent concentrations of carbon nanoparticles (CNPs) (actual values displayed in the discussed example below). Using this method CNT/polymer matrix composites can be successfully fabricated by microwave (MW) irradiation processing. Radio waves can be used for the same purpose when larger composite parts are fabricated or welded, and/or when MW exposure is to be limited due to harmful effects on humans and electronics.

EXAMPLE 1

In this example, carbon nanoparticles (CNPs) can be produced using a heated reactor and catalytic decomposition of a hydrocarbon feed gas. For performing the production process, a catalyst and reaction conditions in the reactor can be selected to provide different types of carbon nanoparticles in selected mass percentage ranges. For example, the reaction conditions and the catalyst can be selected and controlled such that the carbon nanoparticles (CNPs) includes primarily carbon nanotubes (CNTs), or carbon nanofibers (CNFs) or mixtures thereof. One suitable process for producing the carbon nanoparticles (CNPs) is disclosed in U.S. Pat. No. 8,092,778 B2, to Zhu et al., which is incorporated herein by reference.

Figure 1:
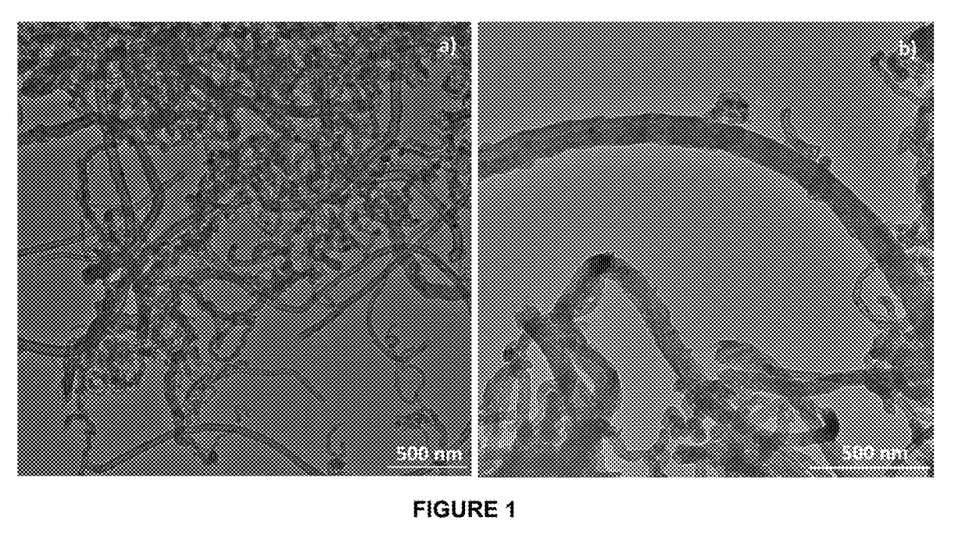
FIG. 1 is a transmission electron micrograph of (a) carbon nanotubes and (b) carbon nanofibers.
Figure 2:
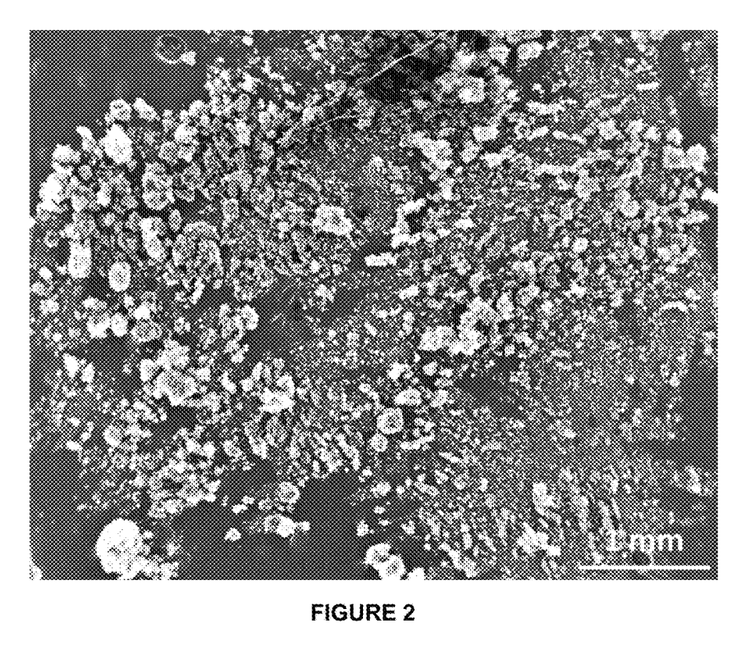
FIG. 2 is a scanning electron micrograph of pristine carbon nanotubes (CNTs) showing their primary agglomeration state.

FIG. 1 illustrates highly graphitic carbon nanotubes (CNTs), which can be used for practicing the present method. FIG. 2 illustrates carbon nanofibers (CNFs), which can be used for practicing the present method. Both the carbon nanotubes (CNTs) and carbon nanofibers (CNFs) were produced using a heated reactor and catalytic decomposition of a hydrocarbon feed gas. As shown in the (a) portion of FIG. 1, the carbon nanoparticles (CNPs) comprise carbon nanotubes (CNTs) containing defects as well as other amorphous forms of nanocarbon as well as catalyst particles. Typically, the carbon nanotubes (CNTs) comprise multi walled carbon nanotubes (MWCNTs) but can also include single walled carbon nanotubes (SWCNTs). In addition, the carbon nanotubes (CNTs) can occur in bundles of carbon nanotubes (CNTs) entrained in amorphous carbon structures. The bulk carbon nanotubes (CNTs) has the texture of powder but can include large lumps and agglomerates of carbon material, such as bundles containing carbon nanotubes (CNTs) and amorphous carbon. In the (b) portion of FIG. 1, the mixture of nanocarbon particles comprises carbon nanofibers (CNFs) containing defects as well as other amorphous forms of nanocarbon as well as catalyst particles.

Rather than being produced in a heated reactor, the carbon nanoparticles (CNPs) can be blended as a desired composition of nanocarbon particles. For example, certain nanocarbon materials are mass produced and commercially available in industrial commodity markets from a producer. One suitable producer is Eden I. of Perth, Australia. With either production or commercial purchase of the nanocarbon mixture, different types of nanocarbon particles, which have been produced from different processes, can be blended or mixed together to provide a particular mixture of nanocarbon particles having desired characteristics, such as desired mass percentage range of a particular type of nanocarbon particles (e.g., CNT, CNF).

The method can be performed with a number of thermoplastic particles including polyolefin matrixes (e.g., polyethylene (PE) and polypropylene (PP) grades), but it is not limited to this kind of thermoplastic particle. For example, the method can be practiced using nylon, polystyrene and polycarbonate. By way of example, the method for our microwaved PP and PE nanocomposites will be hereby described. This includes the following steps: a) Mixing b) Compaction c) Irradiation a) Mixing. The mixing of both powders was carried out at 200 rpm in a ball-mill for a period of 1 hour, utilizing fourteen 10-mm stainless steel balls. A series of mixtures with carbon nanotube (CNT) concentrations from 0.3 wt % to 15 wt % were prepared. In this specific case, the mixing scenario was established with the objective of homogenizing the particles rather than achieving any milling effect. Thus, the milling conditions were set to optimize compression, shear and impact stresses as the particles were mixed. Nonetheless, with these conditions, the carbon nanotubes (CNTs) reached a good level of intermingling with the thermoplastic particles and a very uniform texture was obtained.

The thermoplastic polymer powder may have a range of particle sizes depending on the carbon nanotube (CNT) concentration, mixing extend, type of polymer, type of carbon nanotube (CNT) grade, and shape of the particles. The inventors' study on the effect of the particle size established that thermoplastic polymer powder sizes smaller than 500 um possess an adequate surface area to interact with that of the carbon nanotubes (CNTs), leading to uniform mixtures with appropriate homogeneity for the irradiation step, yet this technique is not limited to any particle size. Thus, in the case of this example, two different PP grades and a PE grade of various particle sizes were utilized.

A further study carried out by the inventors has shown the effect of the viscosity of the thermoplastic polymer of the polymer substrate on the nanocomposite processing. Successful nanocomposites have been prepared with PP and PE grades whose melt flow index (MFI, @ 230° C. and 2.16 Kg) values range from 10 g/10 min to about 200 g/10 min. MFI values lower than these may lead to incomplete consolidation upon irradiation, however the irradiation with electromagnetic radiation technique is not limited by melt-viscosity either.

b) Compaction. After mixing, 0.5 g of the (CNP)/polymer mixture was compressed at about 600 MPa (18 tons) for 2 min into 20 mm disc-shape pellets. Vacuum assisted compression may be used as well to effectively eliminate the gas phase. The formed pellets display sufficient green strength for handling. An electron micrograph, shown in FIG. 3 of the cross-section of the compressed pellets (green body) at 0.5 wt % CNT addition displays how closely the polymer particles are compacted and the carbon nanotubes (CNTs) covering most of the thermoplastic particles surface in a network-like distribution. The particles interfaces are easily recognized in the micrograph as they look like "cracks" while layers of carbon nanotubes (CNTs) (lighter contrast falls between the thermoplastic particles).

c) Irradiation. Each compacted pellet was irradiated independently by microwaves of 2.45 GHz. The actual wave frequency requirements may vary (ranging from radio waves, 20 kHz, all the way up to 300 GHz) depending on the overall impedance magnitude and electrical length of the developed carbon nanotube (CNT) network in the green mixture/pellet, so the optimal irradiation frequency will be the one that maximizes energy absorption. The irradiation conditions were determined after a series of trials to determine optimal parameters: irradiation time and power. For high concentration of carbon nanotubes (CNTs,) a few seconds of irradiation are usually effective; whereas for low concentrations and more aggressive mixing conditions it can take a few minutes, typically less than 4 min. The power should also be tuned to avoid too rapid heating. In this example, the power was set at 1200 W for the low carbon nanotube (CNT) concentration samples and as low as 100 W for high concentration of carbon nanotubes (CNTs). The pellets were placed in between two glass slides when irradiated to flatten the composites into sheets for a suitable characterization. Alternatively, a feedback controller that regulates the output power looped with an IR temperature sensor can be used to avoid too fast heating of the green bodies.

Figure 4:
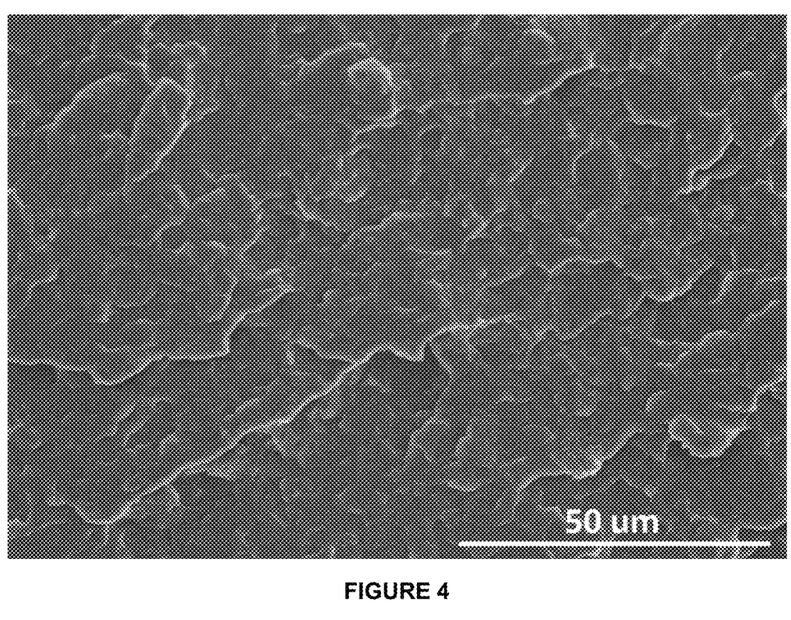
FIG. 4 is a scanning electron micrograph of a cross-section of microwaved CNT/PP nanocomposites at 0.5 wt %.

FIG. 4 displays a micrograph of the cross-section of the cryo-fractured polymer matrix composites at 0.5 wt % upon irradiation. The resulting polymer matrix composites displayed a fully melted and consolidated morphology, with a well-dispersed and distributed microstructure. Carbon nanotube (CNT) clustering was minimal and the section seems very homogenous at 0.5 wt % where the carbon nanotubes (CNTs) have been well-engulfed by the polymer matrix. In some specimens, minor voids developed, but these were overcome by either environmental control during irradiation or post-processing steps. Interestingly enough, after fabrication the nanocomposites still remain very conductive and responsive to microwaves, enabling fast remelting upon post-irradiation for several melting/freezing cycles.

Figure 5:
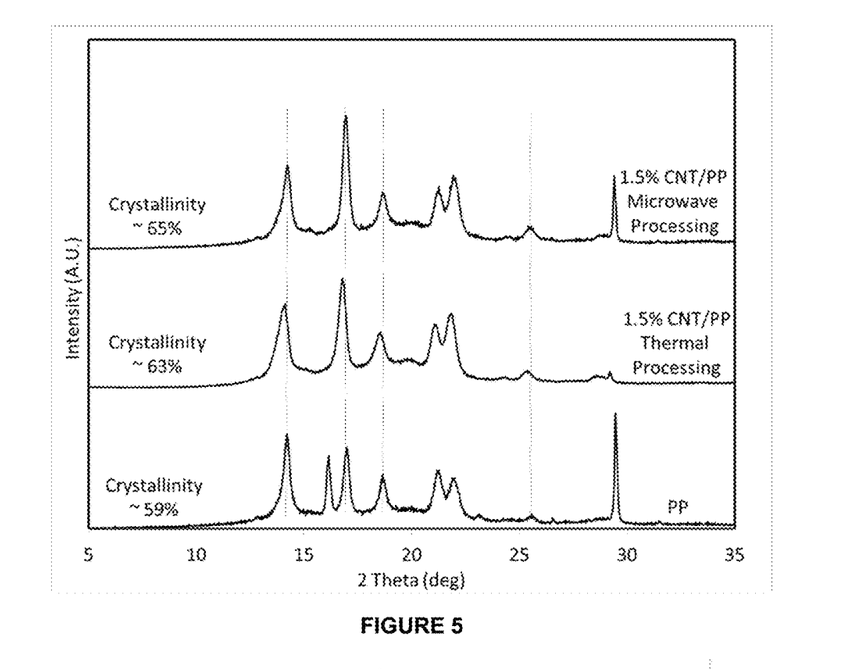
FIG. 5 is an X-ray diffractogram of pure PP, and CNT/PP nanocomposites at 1.5 wt % processed by thermal and microwave heating respectively.

PP and PE matrixes are semicrystalline polymers, which means that they are microstructurally constituted by a combination of amorphous and crystalline regions. Typically, reinforcements have an impact on the crystal phases, crystal size and relative crystallinity content of polymers. FIG. 5 compares representative X-ray diffractograms of the thermally processed polypropylene composites vs. the microwaved ones. It was found that, although the pure PP matrix displayed a mixture of alpha and beta crystal phases, both composites developed only the more stable alpha crystal phase; however, the microwaved composites developed a higher crystallinity level. Consistently, higher levels of crystallinity have been found for the microwaved composites prepared with other polyethylene and polypropylene matrixes as well. This means that there may be both microstructural and interfacial differences contributing to the increased performance of the microwaved nanocomposites. It is important to mention that our method using microwaves for composite fabrication is not limited to semicrystalline thermoplastic matrixes, and can also be used with any kind of amorphous thermoplastics as well. Furthermore, thermoset polymeric matrixes can be well-benefited from any electromagnetic irradiation treatment or processing step as the heat released by carbon nanotubes (CNTs) may enhanced their interfacial bonding, for such a reason, in this method even thermoset resins are included.

Figure 6:
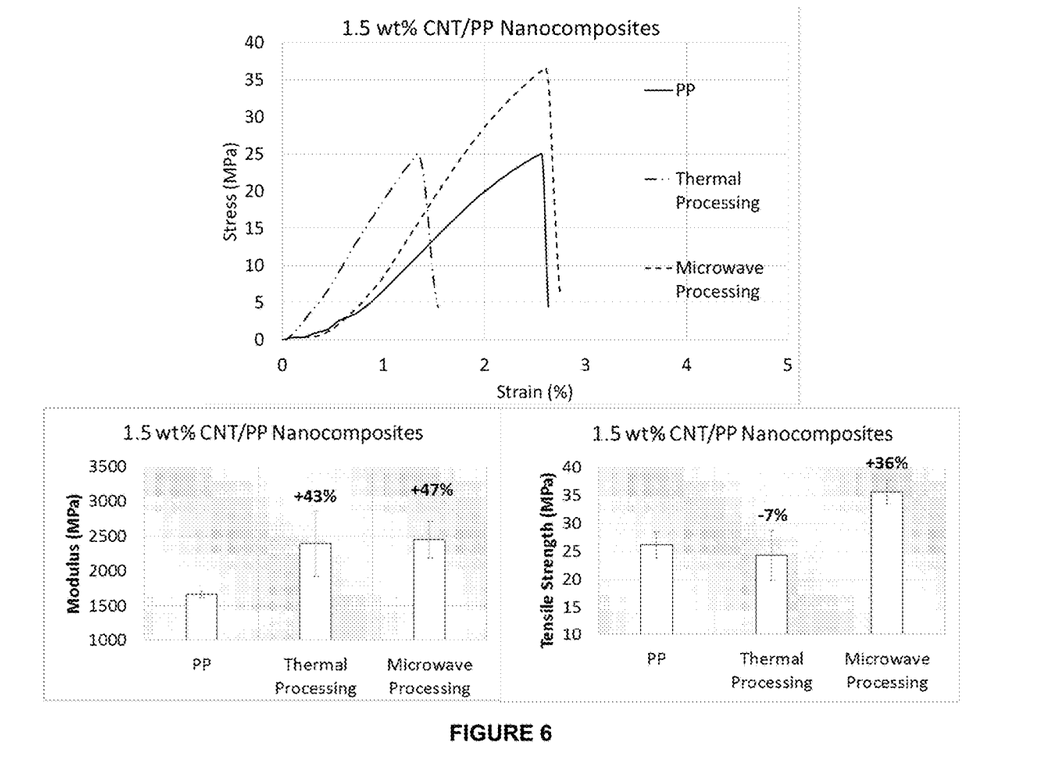
FIG. 6 is a graph illustrating representative stress-strain curves for a nanocomposite at 1.5% CNT in a high melt flow index (MFI) and ultrafine particle size (<100 um) polypropylene matrix, and their average values of modulus and tensile strength relative to the pure PP resin for both thermal and microwave processing techniques.

As shown in FIG. 6, this alternative composite processing methodology has led to PP-based (low viscosity) polymer matrix composites that displayed moduli up to 2.5 GPa, strength values equal to or higher than 35 MPa, and electrical conductivity values of the order of $10^{-2}$ S/m, at only 1.5 wt % CNTs. Equivalent thermal processed composites made by hot-pressing are also displayed.

Figure 7:
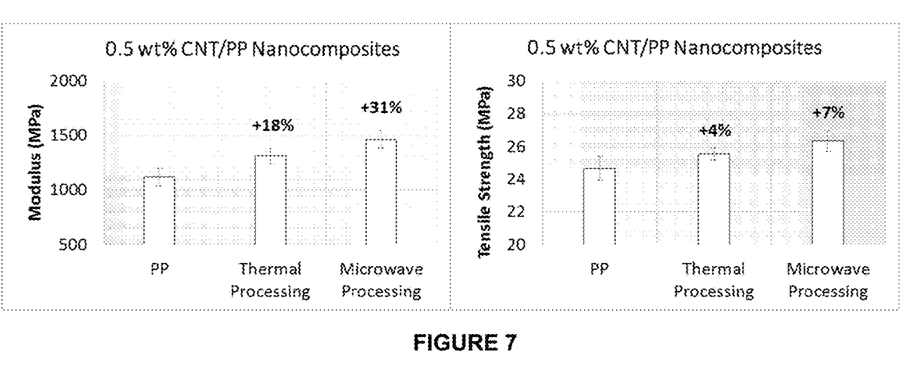
FIG. 7 is a graph illustrating average values of modulus and strength for the nanocomposites prepared via both methodologies at only 0.5 wt % CNT in a medium MFI and medium particle size (<250 um) polypropylene matrix.

It is important to mention that the findings of the inventors are neither limited by any means to any carbon nanotube (CNT) concentration range, nor carbon nanoparticle (CNP) type and morphology, nor polymeric matrix type. All possible carbon nanoparticle (CNP) concentrations (0-100 wt % CNTs) and polymer types can be utilized to prepare the composites via this methodology. In this manner, FIG. 7 displays the modulus and strength values of nanocomposites prepare with a PP resin of medium viscosity at only 0.5 wt % CNTs, it is clearly evident the higher performance of those composites obtained through microwave processing.

Figure 8:
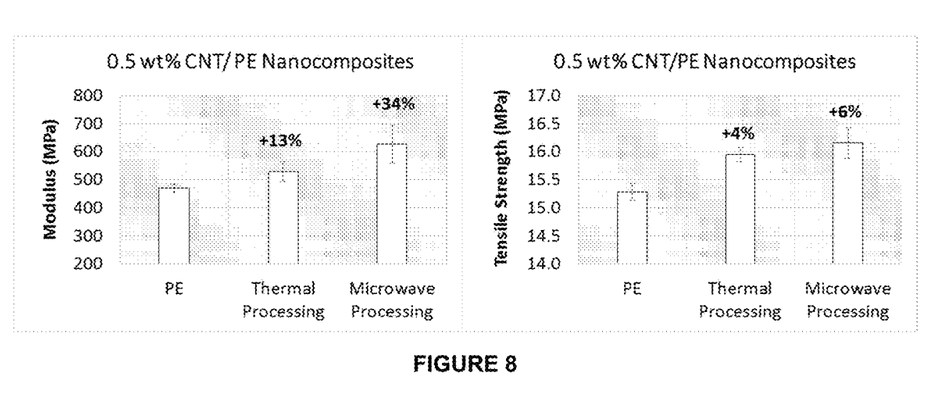
FIG. 8 is a graph illustrating average values of modulus and strength for the nanocomposites prepared via both methodologies at only 0.5 wt % CNT in a high MFI and fine particle size (<150 um) polyethylene (PE) matrix.

Moreover, this specific grade of polymer matrix composites responds so well to microwave heating that, once fabricated, it remained so electrically conductive at such a low carbon nanotube (CNT) concentration that can be remelted and frozen a number of times by post-irradiation without losing its susceptibility to the microwaves and without showing drastic degradation of the polymeric matrix. Likewise, in FIG. 8, the outstanding performance of the composites at only 0.5 wt % CNTs in a low viscosity polyethylene (PE) matrix fabricated via microwave heating is shown. In fact, these microwaved composites displayed moduli values 34% and 21% higher than those of the pure PE resin and the heat-processed composites, respectively. This demonstrates that it is possible to modify different polymeric matrixes via the proposed microwave processing.

EXAMPLE 2

Eden Innovations LTD produces a series of cost-effective and highly graphitic carbon nanotubes (CNTs) and carbon nanofibers (CNFs) grades which have been found effective at reinforcing engineering plastics. EDENPLAST is the brand of a series of nanoparticle-based polymer nanocomposites grades developed with such CNPs by Eden Innovations LTD. For EDENPLAST various pre-treatment methods have been applied to the carbon nanoparticles (CNPs) and combinations of these with other non-carbon nano- and micro-particles have been utilized.

Figure 9:
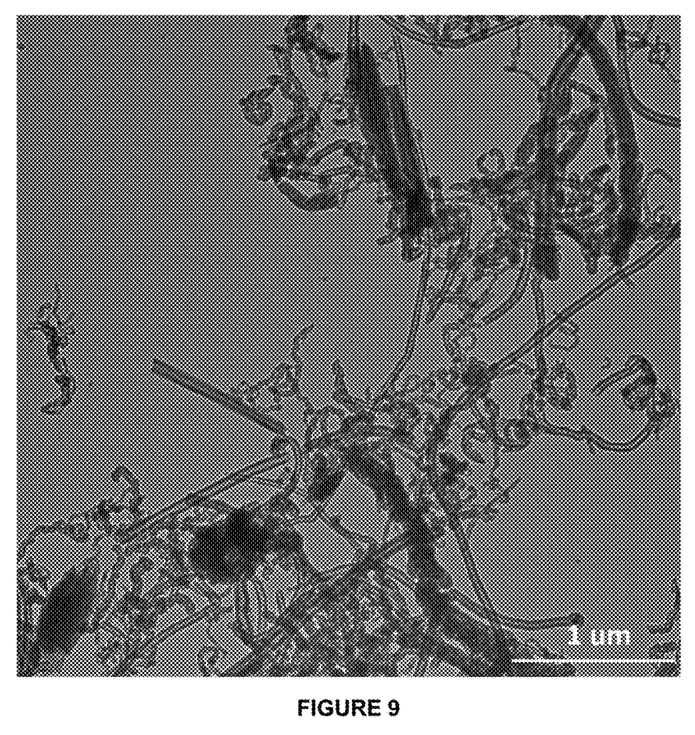
FIG. 9 is a transmission electron micrograph (TEM) image from Example 2 illustrating a transmission electron micrograph (TEM) image of a mixture of CNTs and HNTs (CNT:HNT ratio of 3:1)

As a second example of the versatility of the microwave processing of composites, hereby we present composites prepared by a combination of CNTs and halloysite nanoparticles (HNTs, a type of clay) (FIG. 9). In this case, the HNTs (straight and hollow structures) help disperse the CNTs during pre-treatment and dissipate/distribute the intense heat generated by the irradiation method for a more controlled melting of the matrix. The composites were prepared at 0.5 wt % using the same processing steps as described before for the single particle-polymer composites by irradiation of waves of 2.45 GHz in a polyethylene matrix (PE). The mixture of particles was performed at a ratio of 3:1 of CNT-to-HNT by high-energy mixing methods. Then, the PE particles and NPs were mixed by ball-milling and compacted into pellets as described before for the other microwaved composite grades.

Figure 3:
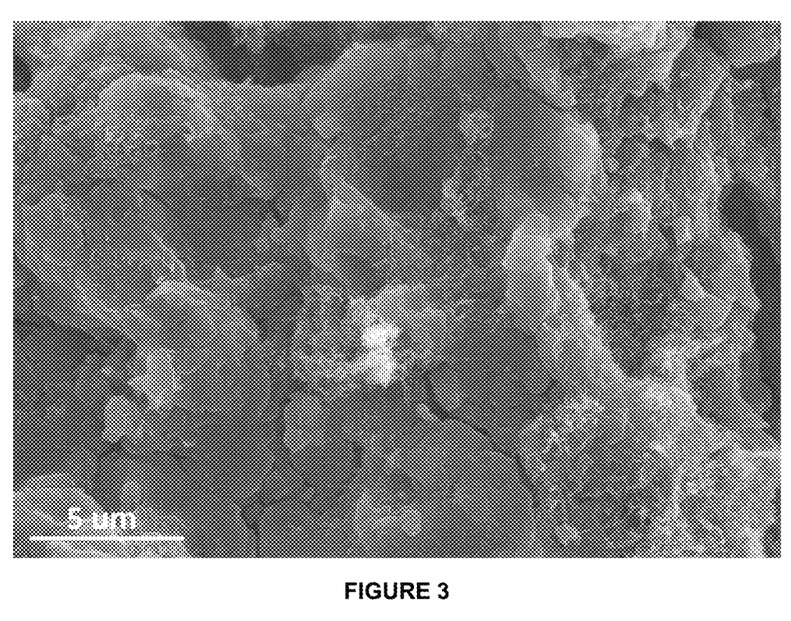
FIG. 3 is a scanning electron micrograph of a cross-section of a compacted pellet (green body) of a homogenous (CNP)/polymer mixture at 0.5 wt %.
Figure 10:
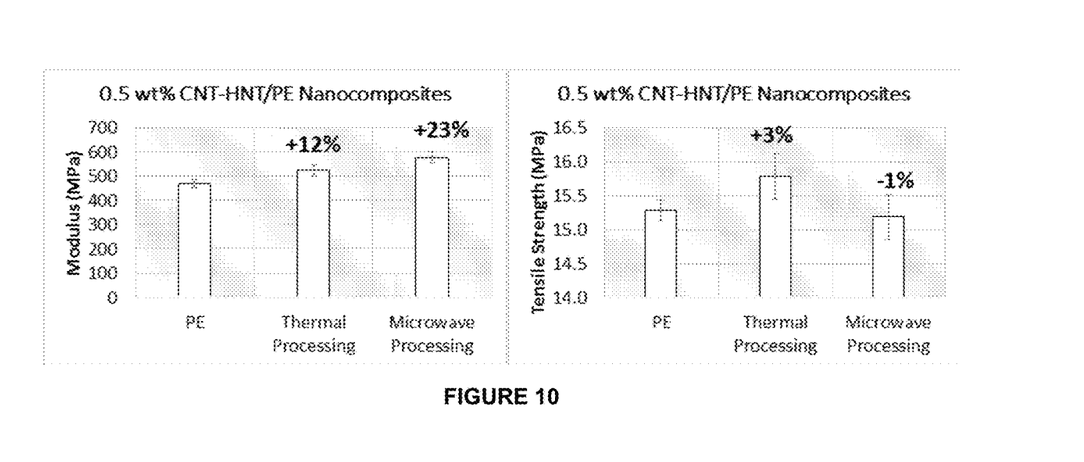
FIG. 10 illustrates graphs with the average values of modulus and strength for the nanocomposites prepared via both methodologies at only 0.5 wt % of a mixture at 3:1 ratio of CNT and HNTs in a high MFI and fine particle size (<150 um) polyethylene (PE) matrix.
Figure 11:
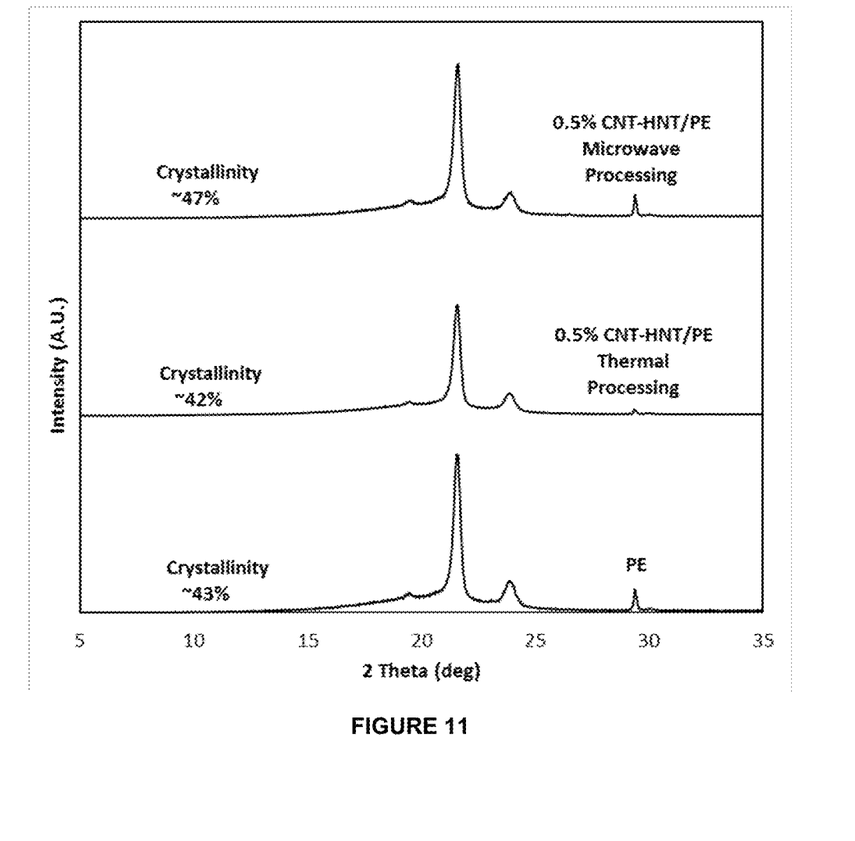
FIG. 11 is a graph illustrating X-ray diffractograms of pure PE, and CNT-HNT (3:1)/PE nanocomposites at 0.5 wt % processed by thermal and microwave heating, respectively.

The mechanical properties of this composite grade are shown in FIG. 10 and compared to the pure resin PE and their corresponding thermally processed composites. It is evident the benefit in modulus of the irradiation method (+11% with respect to the thermally processed composites). Even though this time there was not a significant improvement in strength, this one was retained almost to its entirety. Another interesting phenomenon is the strong effect on the matrix crystallinity content in the composites by the irradiation method as shown in FIG. 3. The modulus of elasticity and crystallinity content (5% more than the thermally processed composites) are well correlated.

This example demonstrates that the CNPs can be pre-combined and modified by other materials to yield different properties in composites prepared via the microwave irradiation processing.

Additionally, the fabrication of a masterbatch of 15 wt % CNT have been achieved as well, for this a more aggressive dry-mixing of the substrates was utilized, and upon irradiation, a true-to-power magnetron applying about 0-500 W was used to keep a well-controlled heating ramp.

In summary, this environmentally friendly, efficient, fast, additive-less, and low-cost method has the following features:

1) Even though electromagnetic wave heating of different materials is a well-known technique, current applications and research work have been limited to heating of highly dielectric materials and welding of plastic parts and related topics. Nonetheless, so far no one has been able to harness such heat generated by carbon nanoparticles into plastic matrixes in order to fabricate polymer nanocomposites. Thus, here a new and alternative fabrication/processing method is claimed.

2) In addition, this fabrication method of carbon nanoparticle polymer matrix composites displays a number of advantages:

a) It is fast, the composites can be prepared in a matter of seconds to minutes (typically less than 4 min) depending on the concentration and pre-mixing conditions of the substrates.

b) Given its volumetric heating, this method is more energy efficient than conventional thermal heating, which makes it more economical and environmentally friendlier.

c) The method yields stronger and stiffer composites as shown above for a few polymers of different physical properties.

d) This method leads to composites with higher electrical conductivity, providing the composites with multi-functionality (mechanical +electrical).

e) Since a number of carbon nanotube (CNT) pre-dispersing techniques can be applied during the mixing step prior to irradiation, the nanocomposites may reach higher dispersion and uniformity levels than those processed by conventional melt-processing (FIG. 4).

f) To enhance the particle-polymer interfacial bonding a number of coupling agents and compatibilizers are typically added in conventional processing which impairs some of the properties of the composites (particularly modulus). In this way, a major advantage of microwave processing is that it does not need such additives at all, avoiding those undesirable effects and enhancing the performance. This signifies a major reduction in costs as well.

Another finding is that the microwaved carbon nanoparticle polymer matrix composites can be remelted multiple times by post-irradiation. This opens the possibility for their use in electromagnetically induced adhesives as well. Industry has been trying to develop this kind of adhesives to join structural fiber/polymer composites by non-contact heating but they have been unsuccessful so far. Nonetheless, this method has already produced such kind of adhesives in the form of a "nanocomposite glue".

As for the scale up of the production of these carbon nanoparticle polymer matrix composites, in spite of the hazardous effects of microwaves on humans and electronics, and proper confinement requirements, there is currently available microwave equipment that is quite large (10 times the size of a microwave oven). But that is not all, direct-contact radio waves are not dangerous and could be used instead to heat up the CNT/polymer mixtures for larger parts and scaled-up applications.

Thus, a novel, rapid, cost-effective, efficient and alternative processing methodology that uses electromagnetic energy is disclosed, which is capable of producing stiffer, more conductive and stronger multi-functional carbon nanoparticle (CNP) polymer composites with potential in a number of industrial and technological applications.

While a number of exemplary aspects and embodiments have been discussed above, those of skill in the art will recognize certain modifications, permutations, additions and subcombinations thereof. It is therefore intended that the following appended claims and claims hereafter introduced are interpreted to include all such modifications, permutations, additions and sub-combinations as are within their true spirit and scope.

What is claimed is:

1. A method for fabricating carbon nanoparticle polymer matrix composites comprising:
   providing a nanoparticle mixture comprising carbon nanoparticles (CNPs) in a concentration of from 0.3 wt % to 80 wt % and having a first particle size and distribution selected to facilitate electromagnetic irradiation;
   providing a plastic substrate comprising a plurality of polymer particles comprising a polymer having a selected composition and a second particle size of less than 500 μm;
   mixing the nanoparticle mixture and the plastic substrate into a homogenous (CNP)/polymer mixture using a wet or dry process configured to provide a uniform nanoparticle distribution of the carbon nanoparticles (CNPs) in the (CNP)/polymer mixture and with the carbon nanoparticles (CNPs) interconnected on a micron scale to form an interconnected electrical network of carbon nanoparticles (CNPs) on surfaces of the polymer particles; and
   following the mixing step, irradiating the (CNP)/polymer mixture with electromagnetic radiation controlled to form a polymer matrix comprised of the polymer and to uniformly consolidate and/or interfacially bond the carbon nanoparticles (CNPs) into the polymer matrix and form a nanocomposite material having a consolidated morphology with the interconnected electrical network of carbon nanoparticles (CNPs) integrated into the polymer matrix;
   wherein the providing the nanoparticle mixture step comprises mixing halloysite nanoparticles with the carbon nanoparticles (CNPs).

2. The method of claim 1 wherein the nanocomposite material comprises a masterbatch.

3. The method of claim 1 further comprising remelting the nanocomposite material multiple times by post irradiation in an adhesive application.

4. The method of claim 1 wherein the plastic substrate comprises a thermoplastic polymer or a thermoset polymer.

5. The method of claim 1 further comprising following the irradiating step, remelting the polymer matrix.

6. A method for fabricating carbon nanoparticle polymer matrix composites comprising:
   providing a first substrate comprising a nanoparticle mixture comprising different types of carbon nanoparticles (CNPs) having a concentration of from 0.3 wt % to 80 wt %;
   providing a second substrate comprising a plurality of polymer particles comprising a polymer having a selected composition and a particle size of less than 500 μm;
   mixing the first substrate and the second substrate into a homogenous (CNP)/polymer mixture using a wet or dry process configured to provide a uniform nanoparticle distribution of the carbon nanoparticles (CNPs) in the (CNP)/polymer mixture and with the carbon nanoparticles (CNPs) interconnected on a micron scale to form an interconnected electrical network of carbon nanoparticles (CNPs) covering surfaces of the polymer particles;
   compacting the (CNP)/polymer mixture to eliminate gas phase material and facilitate irradiation; and
   following the mixing and compacting steps, irradiation the (CNP)/polymer mixture with electromagnetic radiation controlled to uniformly consolidate and/or interfacially bond the carbon nanoparticles (CNPs) into a polymer matrix comprised of the polymer and form a nanocomposite material having a consolidated morphology with the interconnected electrical network of carbon nanoparticles integrated into the polymer matrix, wherein the nanocomposite material comprises a masterbatch having a concentration of the carbon nanoparticles of at least 7.5 wt %.

7. A method for fabricating carbon nanoparticle polymer matrix composites comprising:
   providing a first substrate comprising a nanoparticle mixture comprising different types of carbon nanoparticles (CNPs) having a concentration of from 0.3 wt % to 80 wt %;
   providing a second substrate comprising a plurality of polymer particles comprising a polymer having a selected composition and a particle size of less than 500 μm;
   mixing the first substrate and the second substrate into a homogenous (CNP)/polymer mixture using a wet or dry process configured to provide a uniform nanoparticle distribution of the carbon nanoparticles (CNPs) in the (CNP)/polymer mixture and with the carbon nanoparticles (CNPs) interconnected on a micron scale to form an interconnected electrical network of carbon nanoparticles (CNPs) covering surfaces of the polymer particles;
   compacting the (CNP)/polymer mixture to eliminate gas phase material and facilitate irradiation; and
   following the mixing and compacting steps, irradiation the (CNP)/polymer mixture with electromagnetic radiation controlled to uniformly consolidate and/or interfacially bond the carbon nanoparticles (CNPs) into a polymer matrix comprised of the polymer and form a nanocomposite material having a consolidated morphology with the interconnected electrical network of carbon nanoparticles integrated into the polymer matrix, further comprising following the irradiating step remelting the polymer matrix by microwave irradiation.

* * * * *